US012663334B2

(12) United States Patent
Warner et al.

(10) Patent No.: US 12,663,334 B2
(45) Date of Patent: Jun. 23, 2026

(54) ROCKER PANEL RESTRAINT CLAMP KIT, AERODYNAMIC TEST ASSEMBLY INCLUDING SAME, METHODS OF USING SAME, AND METHOD OF SECURING DIFFERENT VEHICLES DURING AERODYNAMIC TESTING

(71) Applicant: Honda Motor Co., Ltd., Tokyo (JP)

(72) Inventors: Brian Matthew Warner, Marysville, OH (US); James Michael Przeklasa, Marysville, OH (US); Matthew L. Metka, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 18/495,166

(22) Filed: Oct. 26, 2023

(65) Prior Publication Data

US 2025/0137873 A1 May 1, 2025

(51) Int. Cl.
*G01M 9/04* (2006.01)
*G01M 17/007* (2006.01)

(52) U.S. Cl.
CPC ............ *G01M 9/04* (2013.01); *G01M 17/007* (2013.01)

(58) Field of Classification Search
CPC ... G01M 9/04; G01M 17/007; G01M 17/0074
See application file for complete search history.

(56) References Cited

U.S. PATENT DOCUMENTS

| | | | |
|---|---|---|---|
| 4,070,899 A | 1/1978 | Venalainen | |
| 4,337,636 A * | 7/1982 | Clausen | B21D 25/04 |
| | | | 72/457 |
| 4,516,423 A | 5/1985 | Reich | |
| 4,573,337 A | 3/1986 | Papesh | |
| 4,628,723 A | 12/1986 | Buske | |
| 4,862,727 A | 9/1989 | Bergeron | |
| 6,185,982 B1 * | 2/2001 | Ballard | B21D 1/14 |
| | | | 72/457 |
| 6,231,095 B1 | 5/2001 | Chou et al. | |

(Continued)

FOREIGN PATENT DOCUMENTS

| | | |
|---|---|---|
| CN | 202071901 U | 12/2011 |
| CN | 206269774 U | 6/2017 |

(Continued)

*Primary Examiner* — Timothy P Graves
(74) *Attorney, Agent, or Firm* — KENEALY VAIDYA LLP

(57) ABSTRACT

A clamp kit and method for removably connecting a vehicle to a load cell in a wind tunnel can include a clamp module, at least one extension and a third fastener. The clamp module can include first and second jaws, a drive member, and a clamp fastener. The clamp fastener can be connected to the second jaw. The at least one extension can include first and second fasteners. The clamp module can be connected to a post member to form a first configuration clamp when the third fastener is directly connected to both of the clamp fastener and a fastener of the post member, and the clamp module and the extension can be connected to the post member to form a second configuration clamp when the first fastener is directly connected to the clamp fastener and the second fastener is directly connected to the fastener of the post member.

18 Claims, 6 Drawing Sheets

(56) References Cited

U.S. PATENT DOCUMENTS

| | | | |
|---|---|---|---|
| 6,568,237 B1 | 5/2003 | Graham et al. | |
| 7,549,313 B2 * | 6/2009 | Espinosa .................. | B21D 1/14 |
| | | | 72/457 |
| 10,167,019 B2 | 1/2019 | Ayuzawa et al. | |
| 11,020,782 B2 | 6/2021 | Venalainen | |
| 2012/0128413 A1 | 5/2012 | Suwazono | |
| 2016/0313214 A1 * | 10/2016 | Takahashi ......... | G01M 17/0072 |
| 2018/0207700 A1 * | 7/2018 | Serbes ..................... | B66F 7/12 |
| 2020/0255068 A1 | 8/2020 | De Smidt et al. | |

FOREIGN PATENT DOCUMENTS

| | | | |
|---|---|---|---|
| CN | 207445560 U | 6/2018 | |
| CN | 207790865 U | 8/2018 | |
| CN | 209126811 U | 7/2019 | |
| CN | 110108436 A | 8/2019 | |
| CN | 210232279 U | 4/2020 | |
| CN | 211519681 U | 9/2020 | |
| EP | 0215512 A3 | 10/1987 | |
| JP | H0632209 A | 2/1994 | |
| JP | 2004161078 A | 6/2004 | |
| JP | 2022068541 A | 5/2022 | |
| KR | 101085821 B1 | 11/2011 | |
| KR | 101687512 B1 | 12/2016 | |

* cited by examiner

ROCKER PANEL RESTRAINT CLAMP KIT, AERODYNAMIC TEST ASSEMBLY INCLUDING SAME, METHODS OF USING SAME, AND METHOD OF SECURING DIFFERENT VEHICLES DURING AERODYNAMIC TESTING

BACKGROUND

The disclosed subject matter relates to a kit for adjusting a rocker panel restraint clamp to compensate for a predetermined range of vehicle ground clearances. More particularly, the disclosed subject matter relates to methods and apparatus for securing a vehicle to a load cell or balance during aerodynamic testing of each vehicle of a plurality of different vehicles in a wind tunnel.

Aerodynamic drag is an increasingly important factor in ground vehicle (automotive) design due to its large impact on overall fuel economy for vehicles having an internal combustion engine or battery range for electric vehicles. Reducing automotive fuel/energy consumption (or increasing fuel/energy economy) and increasing the drivable range between battery recharging yields significant benefits, such as reducing global fossil fuel consumption and improving customer experience.

A vehicle's drag can be closely studied and possibly improved based on data collected from aerodynamic testing performed on the vehicle in a wind tunnel. The wind tunnel can include a stationary bed or a rolling road bed. The vehicle wheels do not rotate on a stationary bed and this lack of rotation can adversely affect the data and the resulting analysis. The vehicle's wheels can rotate on a rolling bed and the collected data can more closely simulate the aerodynamic conditions acting on the vehicle in real-world use. The vehicle can be secured to one or more load cells mounted within or below the test bed. The load cell(s) can include one or more sensors that are configured to output data that is indicative of the loads acting on the vehicle during the test. The data can be studied and the structure of the vehicle can be revised to provide an advantageous compromise between fuel efficiency and other factors such as, but not limited to, vehicle price, ease of manufacturing, perceived aesthetic appearance, and vehicle dimension.

SUMMARY

Some embodiments are directed to a rocker panel restraint clamp kit for removably connecting a vehicle to a load cell in a wind tunnel. The kit can include a clamp module, a post member, at least one extension and a third fastener. The clamp module can include a first jaw, a second jaw, a drive member, and a clamp fastener. The drive member can be connected to the first jaw and the second jaw and configured to displace the first jaw toward and away from the second jaw. The clamp fastener can be connected to the second jaw. The post member can include a post fastener and the at least one extension can include a first fastener and a second fastener. The clamp module and the post member can form a first configuration clamp when the third fastener is directly connected to both of the clamp fastener and the post fastener, and the clamp module, the post member, and the extension can form a second configuration clamp when the first fastener is directly connected to the clamp fastener and the second fastener is directly connected to the post fastener.

Some embodiments are directed to a rocker panel restraint clamp kit for removably securing a vehicle to a test bed of a wind tunnel. The kit can include a first clamp and a second clamp. The first clamp can include a first base, a first fixed jaw, a first movable jaw, a first drive member, and a first post member. The first base can have a first length along a longitudinal axis of the first clamp. The first fixed jaw can be connected to the first base and the first movable jaw can be movably mounted onto the first fixed jaw. The first drive member can be connected to the first fixed jaw and the first movable jaw and configured to displace the first movable jaw toward and away from the first fixed jaw. The first post member can be configured to be connected to the first base. The second clamp can include a second base, a second fixed jaw, a second movable jaw, a second drive member, and a second post member. The second base can have a second length along a longitudinal axis of the second clamp that is greater than the first length. The second fixed jaw can be connected to the second base and the second movable jaw movably mounted onto the second fixed jaw. The second drive member can be connected to the second fixed jaw and the second movable jaw and configured to displace the second movable jaw toward and away from the second fixed jaw. The second post member can be connected to the second base.

Some embodiments are directed to a method of securing different vehicles during aerodynamic testing using an adjustable rocker panel restraint clamp connected to a load cell, the method can include: providing a first vehicle having a first rocker panel height; creating a first configuration of the adjustable rocker panel restraint clamp by connecting a post member directly to a clamp module of the adjustable rocker panel restraint clamp such that the adjustable rocker panel restraint clamp has a first clamp height that falls within a predetermined range of clamp heights relative to a test bed surface; clamping the first configuration of the adjustable rocker panel restraint clamp to a rocker panel flange of the first vehicle; removing the first configuration of the adjustable rocker panel restraint clamp from the first vehicle; providing a second vehicle having a second ground clearance height that is greater than the first ground clearance height; disassembling the first post member from the clamp module; creating a second configuration of the adjustable rocker panel restraint clamp by connecting a first extension to the clamp module and connecting the first post member to the first extension such that the adjustable rocker panel restraint clamp has a second clamp height that falls within the predetermined range of clamp heights relative to the test bed surface; and clamping the second configuration of the adjustable rocker panel restraint clamp to a rocker panel flange of the second vehicle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
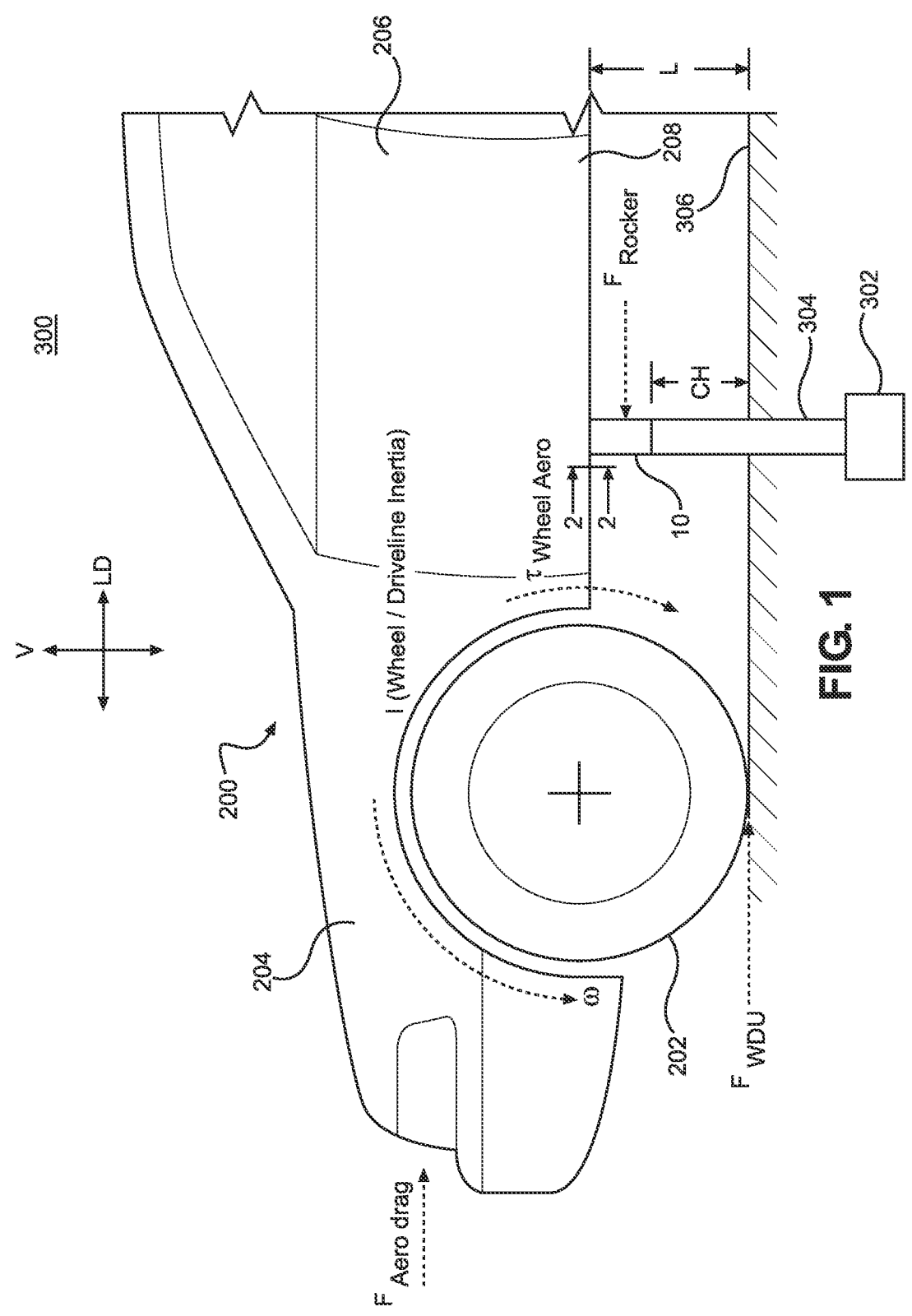
FIG. 1 is a schematic illustration of an adjustable rocker panel restraint clamp made in accordance with principles of the disclosed subject matter and clamped onto a vehicle in a wind tunnel.
Figure 2:
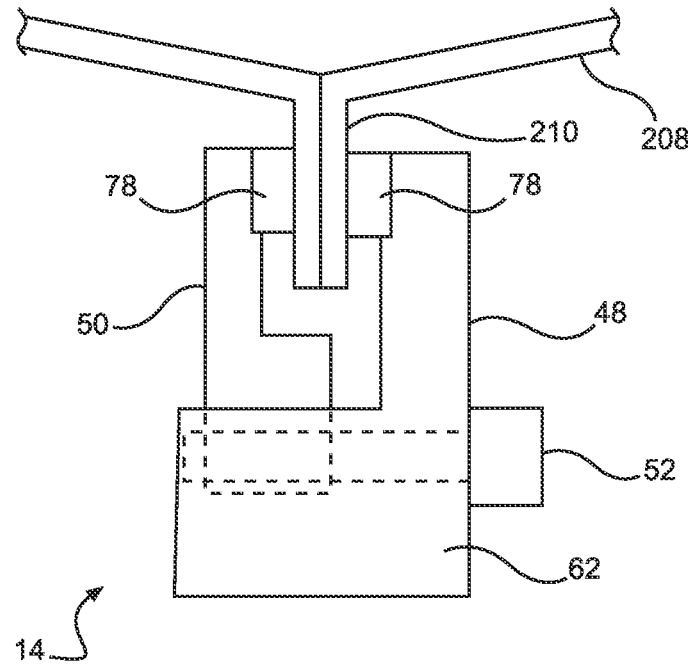
FIG. 2 is a cross-sectional view taken along line 2-2 of FIG. 1.

FIG. 1 schematically illustrates a side view of a front half of a vehicle 200 in a wind tunnel 300 and an adjustable rocker panel restraint clamp 10 made in accordance with principles of the disclosed subject matter. The clamp 10 can secure the vehicle 200 to a load cell (or load measurement balance) 302 of the wind tunnel 300. The vehicle 200 can include a front wheel 202, a front fender 204, a door 206 and a rocker panel 208. The rocker panel 208 can extend on a longitudinal direction LD of the vehicle 200 from the front fender 204 to a rear fender (not shown) and below the door 206 with respect to a vertical direction V of the vehicle 200. Referring to FIG. 2, the rocker panel 208 can include a flange 210 (also referred to as a pinch weld) and the clamp 10 can be clamped onto the flange 210. Returning to FIG. 1, a rocker panel restraint post 304 can be connected to each of the clamp 10 and the load cell 302. The clamp 10 and the restraint post 304 can transfer loads applied to the vehicle 200 to the load cell 302. The load cell 302 can be configured to detect the loads input from the clamp 10 and the restraint post 304 and create data indicative of the aerodynamic loads acting on the vehicle 200 during the operation of the wind tunnel 300. The load cell 302 can transmit the data to an appropriate data storage device and/or to a computer that can process the data for studying in real-time and/or stored for later use and study.

The wind tunnel 300 can include a test bed 306. The test bed 306 can be a stationary bed or a rolling road bed. The test bed 306 can also be referred to as a ground plane. It can be advantageous to position the clamp 10 at a predetermined clamp height CH above the surface of the test bed 306 to accurately determine the location of the rocker panel restraint clamp 10.

FIG. 1 shows the loads acting on the adjustable rocker panel clamp 10 during the wind tunnel test. When the vehicle 200 is tested in a wind tunnel 300 that includes a rolling road test bed 306, the clamp 10 can resist the force $F_{ROCKER}$, where $F_{ROCKER} = F_{AERO\ DRAG} + F_{WDU}$, and where $F_{WDU}$ refers to wheel drive unit force and $F_{AERO\ DRAG}$ refers to force on the vehicle due to aerodynamic drag in the wind tunnel. The wheel drive unit force $F_{WDU}$ can be determined from the wheel/driveline inertia I, the angular velocity $\omega$ of the wheel 202 (or the angular acceleration/deceleration of the wheel 202), the radius r of the wheel 202 (including the tire), and the aerodynamic torque $T_{AERO}$ applied to the wheel 202. As will be discussed in further detail below, the clamp 10 can include a pivot. Thus, the predetermined clamp height CH can create a moment that is applied to the rocker panel restraint post 304 and the load cell 302. The predetermined clamp height CH can be set so that the moment applied to the rocker panel restraint post 304 and the load cell 302 will not adversely impact the performance of the rocker panel restraint post 304 and the load cell 302. That is, a maximum moment can be determined based on a range of possible rocker panel heights H, and the clamp height CH can be set so that the moment applied to the rocker panel restraint post 304 and the load cell 302 is less than the maximum moment.

The vehicle 200 being tested can come in many different configurations such as, but not limited to, a sports car, a sedan, a minivan, a pick-up, a sport-utility vehicle (also referred to as an SUV), a cross-over, etc. The vehicle 200 can be also referred to as a first vehicle 200(1), a second vehicle 200(2) or a third vehicle 200(3), etc. Each of these different configurations can have unique physical dimensions such as ground clearance (also referred to as ride height). As a result, a rocker panel height L of the rocker panel flange 210 above the surface of the test bed 306 can vary over a wide range. A wide range of possible rocker panel heights L can make it difficult to position the clamp 10 at the predetermined clamp height CH (or within a predetermined range R of clamp heights shown in FIG. 4). Thus, there is a need for a rocker panel restraint clamp that can be adjusted to accommodate a wide range of rocker panel heights L for different vehicles 200 that are tested in the wind tunnel 300. There is also a need for a rocker panel restraint clamp that can be adjusted to move the height of the pivot axis of the clamp with respect to the test bed 306.

Figure 3:
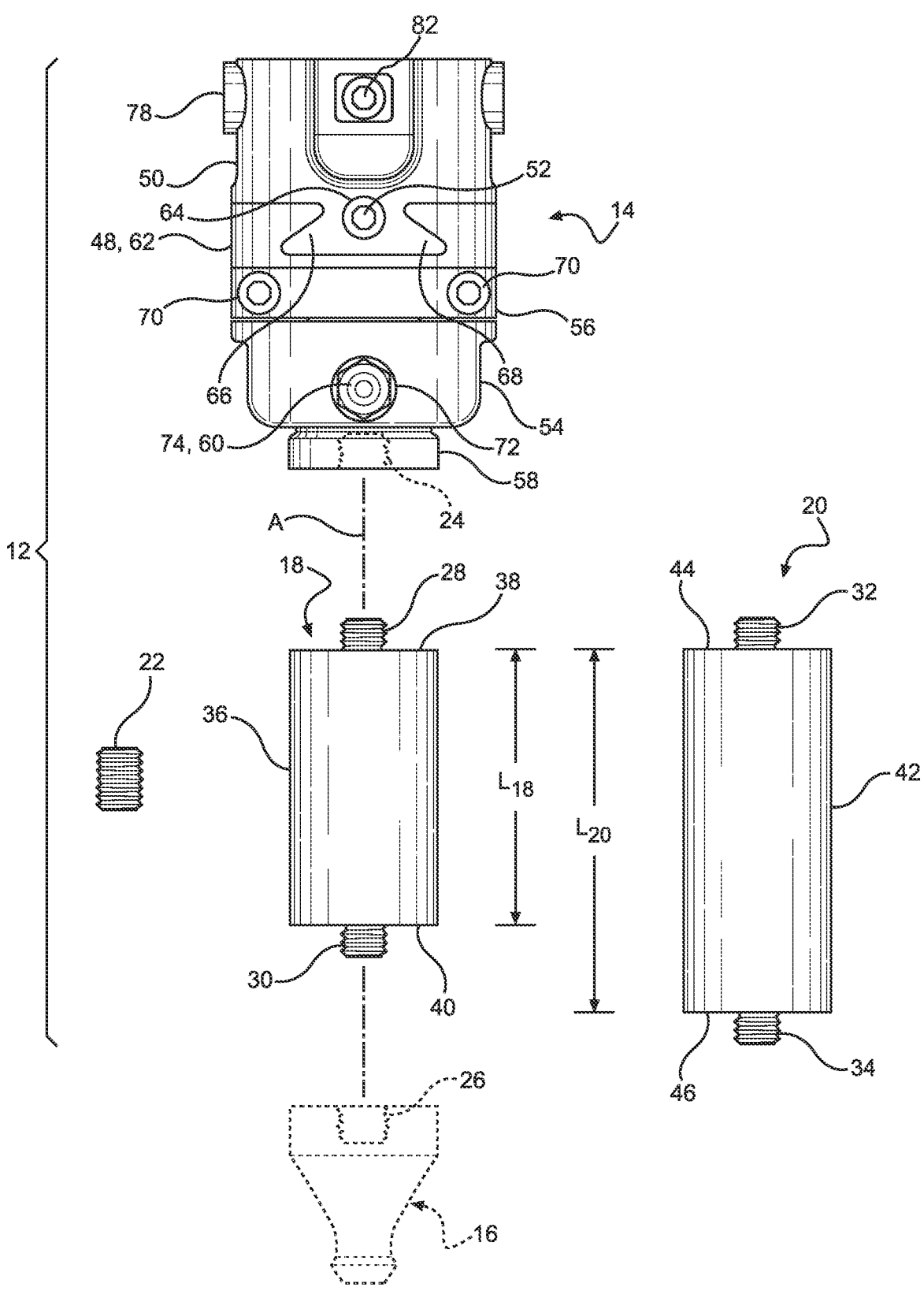
FIG. 3 is a plan view of a kit that can be used to create a plurality of different configurations of the adjustable rocker panel restraint clamp of FIG. 1.

FIG. 3 is a plan view of a kit 12 from which a plurality of different configurations 10A, 10B, 10C of the adjustable rocker panel restraint clamp 10 can be created in order to accommodate a wide range of rocker panel heights L. The kit 12 can include a clamp module 14, a first extension 18, a second extension 20, and a module fastener 22. The module fastener 22 can be considered another extension that has no body between upper and lower fastening portions.

The clamp module 14 can be configured to be secured to the rocker panel restraint post 304 in any appropriate manner. In particular, a post member 16 shown in phantom in FIGS. 3-6 can be inserted into the rocker panel restraint post 304 and the clamp module 14 can be connected to the post member 16. The clamp module 14 can include a clamp fastener 24, the post member 16 can include a post fastener 26, the first extension 18 can include a pair of extension fasteners 28, 30 and the second extension 20 can include a pair of extension fasteners 32, 34. The extensions 18, 20 can be added or removed in order adjust the clamp height CH of the rocker panel restraint clamp 10 to fall in the range R of clamp heights shown in FIG. 4.

Figures 5, 6, 7:
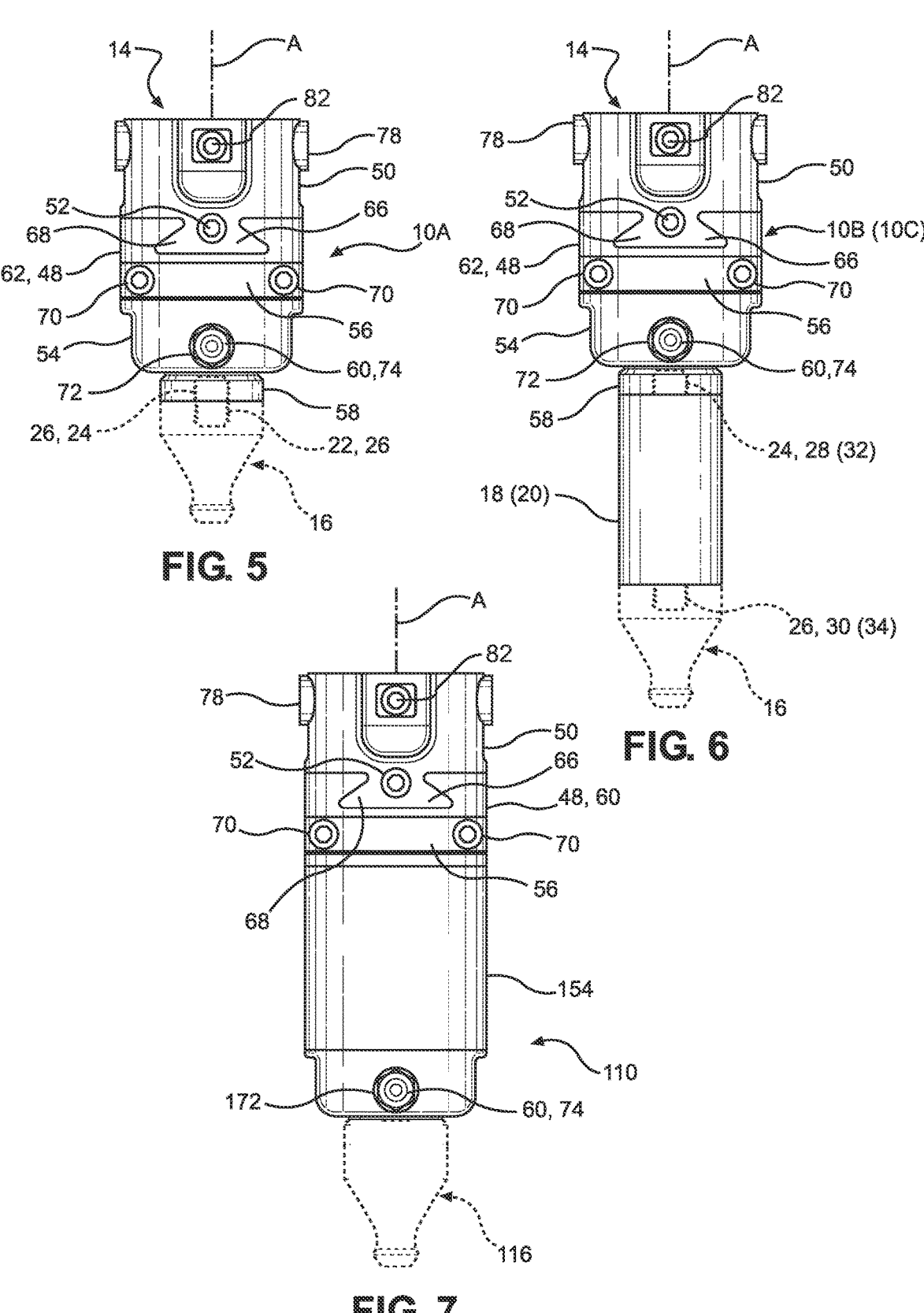
FIG. 5 is a plan view of a first configuration of the adjustable rocker panel restraint clamp of FIG. 1 from the kit of FIG. 3.
FIG. 6 is a plan view of a second configuration of the adjustable rocker panel restraint clamp of FIG. 1 from the kit of FIG. 3.
FIG. 7 is a plan view of a second embodiment of a rocker panel restraint clamp made in accordance with principles of the disclosed subject matter that can be included with the kit.

Referring to FIG. 5, the module fastener 22 can be directly connected to both of the clamp fastener 24 and the post fastener 26 to create a first configuration clamp 10A. Referring to FIG. 6, the first extension fastener 28 of the first extension 18 can be directly connected to clamp fastener 24 and second extension fastener 30 of the first extension 18 can be directly connected to the post fastener 26 to create a second configuration clamp 10B. The first extension fastener 32 of the second extension 20 can be directly connected to clamp fastener 24 and second extension fastener 34 of the second extension 20 can be directly connected to the post fastener 26 to create a third configuration clamp 10C as indicated in FIG. 6 by the reference numbers in parentheses.

Figure 4:
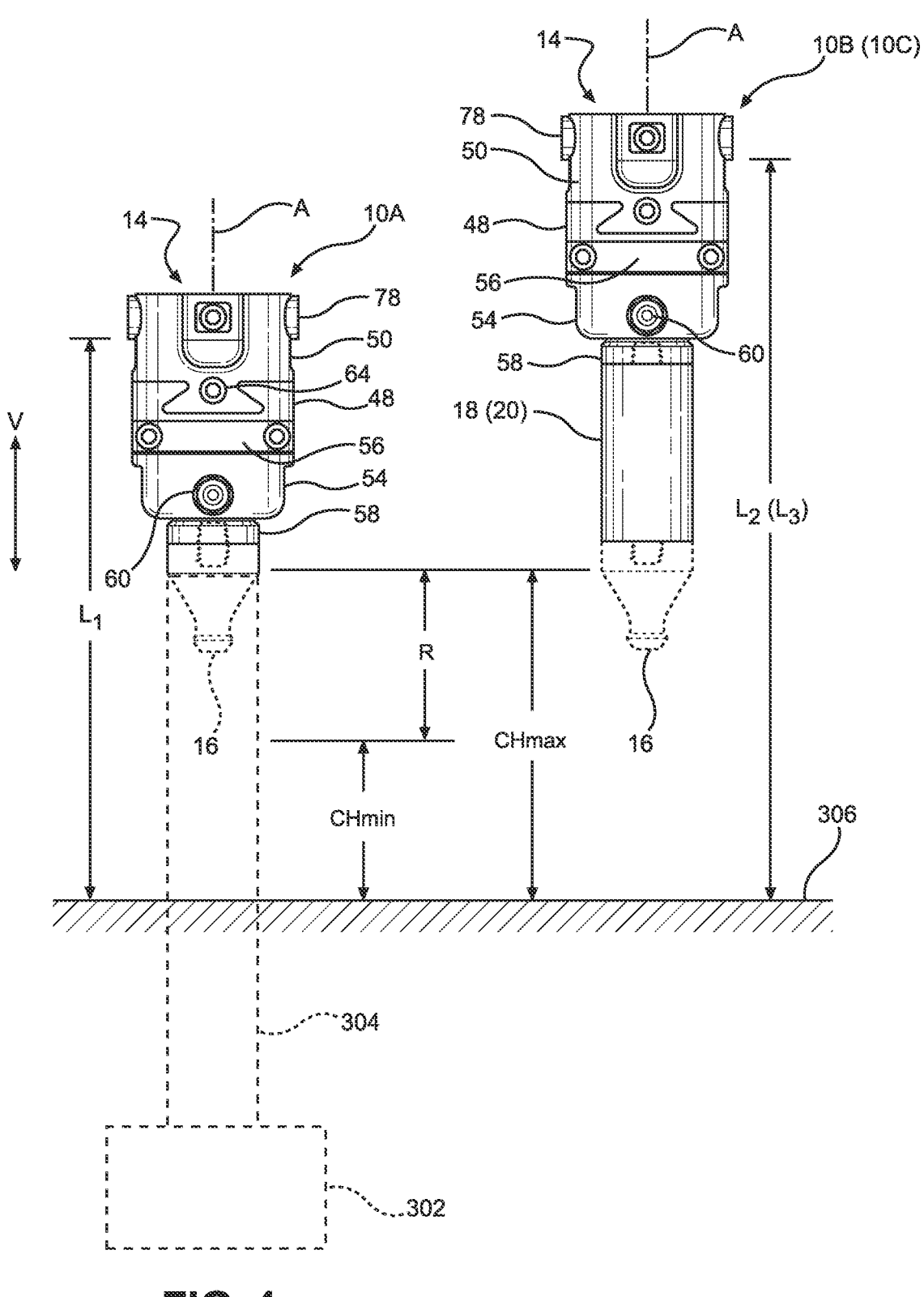
FIG. 4 is a plan view of two configurations of the adjustable rocker panel restraint clamp of FIG. 1 and illustrates spatial relationships between the two configurations of the clamp and each of a rocker panel height, a position range and a test bed surface of the wind tunnel.

FIG. 4 shows a comparison of the first and second configuration clamps 10A, 10B with respect to the surface of the test bed 306. The load cell 302 and the restraint post 304 are shown schematically and in phantom to provide a frame of reference with respect to FIG. 1.

The first and second configuration clamps 10A, 10B can be usable in a predetermined range R of distances delimited by a maximum clamp height CHmax and a minimum clamp height CHmin. When the first configuration clamp 10A is located in the predetermined range R of clamp heights CH, the video sensor 308 can accurately locate the position of the clamp 10. When the first configuration 10A of the clamp 10 is above and outside of the predetermined range R of clamp heights CH, the accuracy of the position data obtained by the video sensor 308 can deteriorate and/or adversely affect the analysis of the test data.

FIG. 4 shows the first configuration clamp 10A located at the maximum clamp height CHmax if clamped onto a rocker panel flange 210 that is at a first rocker panel height L1 above the surface of the test bed 306 in the vertical direction V. However, the clamp 10A can be out of position with respect to the video sensor 308 if the first height configuration 10A is clamped onto a rocker panel flange 210 that is at a second rocker panel height L2 above the surface of the test bed 306 in the vertical direction V, where the second height L2 is greater than the first height L1. The first configuration clamp 10A can be disassembled and reassembled using the kit 12 to create the second configuration clamp 10B or the third configuration clamp 10C. The second configuration clamp 10B can extend from the second rocker panel height L2 and into the predetermined range R so that the accuracy of the video sensor 308 data can remain as reliable for the vehicle 10 with the higher rocker panel height (see L2) as compared to the data for the vehicle 10 with a lower rocker panel height (see L1).

Returning to FIG. 3, the first extension 18 can include a body 36 that is generally cylindrical in shape. The extension fasteners 28, 30 can be located at respective ends 38, 40 of the body 36. The fasteners 28, 30 can be threaded studs and the fasteners 24, 26 can be threaded bores. However, alternate embodiments can include a reversed arrangement in which the extension fasteners 28, 30 are threaded bores and the fasteners 24, 26 are threaded studs. Further, alternate embodiments can include one of the extension fasteners 28, 30 as a threaded stud and the other of the extension fasteners 28, 30 as a threaded bore and the fasteners 24, 26 can be of the appropriate mating threaded configuration.

The first extension 18 can have a length L18 measured along the longitudinal axis A from the ends 38, 40 of the extension body 36. Thus, the first extension 18 can be used to clamp rocker panel flange 210 that is located at a flange height L (FIG. 1) that is between the first rocker panel height L1 and the second rocker panel height L2, inclusively, where the second height L2 is equal to the sum of the first height L1 and the length L18. The length L18 of the first extension 18 can be set so that the moment acting on the rocker panel restraint post 304 and the load cell 302 is less than the maximum moment.

The second extension 20 can have the same or similar construction as the first extension 18, except that the second extension 20 can have a second length L20 measured along the longitudinal axis A from the ends 44, 46 of the body 42. Thus, the second extension 20 can be used to clamp rocker panel flanges 210 that are located at a flange rocker panel height L (FIG. 1) that is between the first rocker panel height L1 and a third rocker panel height L3, inclusively, where the third height L3 is equal to the sum of the first height L1 and the length L20. As compared the first extension 18, the second extension 20 can be clamped onto a rocker panel flange 210 that is at the third height L3 that is greater than the second height L2 provided by the first extension 18 by an amount that is equal to the difference between the length L20 of the second extension 20 and the length L18 of the first extension 18. The length 20 of the second extension 20 can be set so that the moment acting on the rocker panel restraint post 304 and the load cell 302 is less than the maximum moment.

The combination of the kit 12, the load cell 302, and the rocker panel restraint post 304 can be referred to as an aerodynamic test assembly. The aerodynamic test assembly 12, 302, 304 can be used in a method that includes a step of providing a first vehicle 200(1) having a rocker panel height L. One of the configuration clamps 10A, 10B, 10C can be clamped onto the rocker panel flange 210 of the first vehicle 200(1). The load cell 302 can be used to collect load data when the adjustable rocker panel restraint clamp 10 is clamped to any one of the vehicles 200(1), 200(2), 200(3). The one of the configuration clamps 10A, 10B, 10C can be removed from the rocker panel flange 210 when the aerodynamic test of the first vehicle 200(1) is complete. The first vehicle 200(1) can be removed from the test bed 306 and a second vehicle 200(2) can be provide on the test bed 306. The second vehicle 200(2) can have a second rocker panel height L that is different from the rocker panel height L of the first vehicle 200(1). The one of the configuration clamps 10A, 10B, 10C used for the first vehicle 200(1) can be disassembled and the kit 14 can be used to create a different one of the configuration clamps 10A, 10B, 10C. The different one of the configuration clamps 10A, 10B, 10C can be clamped onto the rocker panel flange 210 of the second vehicle 200(2), and the second vehicle 200(2) can be tested in the wind tunnel 300.

In an exemplary execution of the method described above, the first configuration clamp 10A can be clamped onto the rocker panel flange 210 of the first vehicle 200(1). After completing the aerodynamic testing for the first vehicle 200(1), the first configuration clamp 10A can be removed from the first vehicle 200(1) and the first vehicle can be removed from the test bed 306. A second vehicle 200(2) can be provided on the test bed 306, where the second vehicle 200(2) has a second rocker panel height L2 that is greater than the first rocker panel height L1. The first post member 26 can be disassembled from the clamp module 14 and a second configuration clamp 10B can be created from the kit 12 by connecting the first extension 18 to the clamp module 14 and connecting the post member 16 to the first extension 18 such that the adjustable rocker panel restraint clamp (see 10A) has a second clamp height that falls within a predetermined range R of clamp heights CH relative to a test bed surface (see surface of test bed 306). The second configuration clamp 10B can be clamped onto the rocker panel flange 210 of the second vehicle 200(2) and aerodynamic testing of the second vehicle 200(2) can be performed using the load cell 302 to collect the data.

The steps described above with respect to the second configuration clamp 10B and the second vehicle 200(2) can be repeated using the third configuration clamp 10C on a third vehicle 200(3) that has third rocker panel height L3 that is greater than the second rocker panel height L2. The load cell 302 can collect the data when the third configuration clamp 10C is clamped onto the third vehicle 200(3).

Accordingly, the kit can be used to create a plurality of different configurations of the adjustable rocker panel restraint clamp 10 that can compensate for a wide range of rocker panel heights L, while also keeping the location of the clamp 10 in a predetermined range R of clamp heights CH. The predetermined range R of clamp heights CH can provide a desired level of accuracy for the data obtained by the video sensor 38 that is consistent across a plurality of different vehicles tested in the wind tunnel 300. The predetermined range R of clamp heights CH can provide a desired moment that acts on the rocker panel restraint post 304 and the load cell 302 that is less than a predetermined maximum moment.

Further, the components of the kit 12 can be easily assembled and disassembled. This can reduce downtime for the wind tunnel 300 and increase the number of vehicles 200 that can be tested in the wind tunnel 300 over a predetermined time period, thereby increasing the efficiency of the wind tunnel 300.

Figure 8:
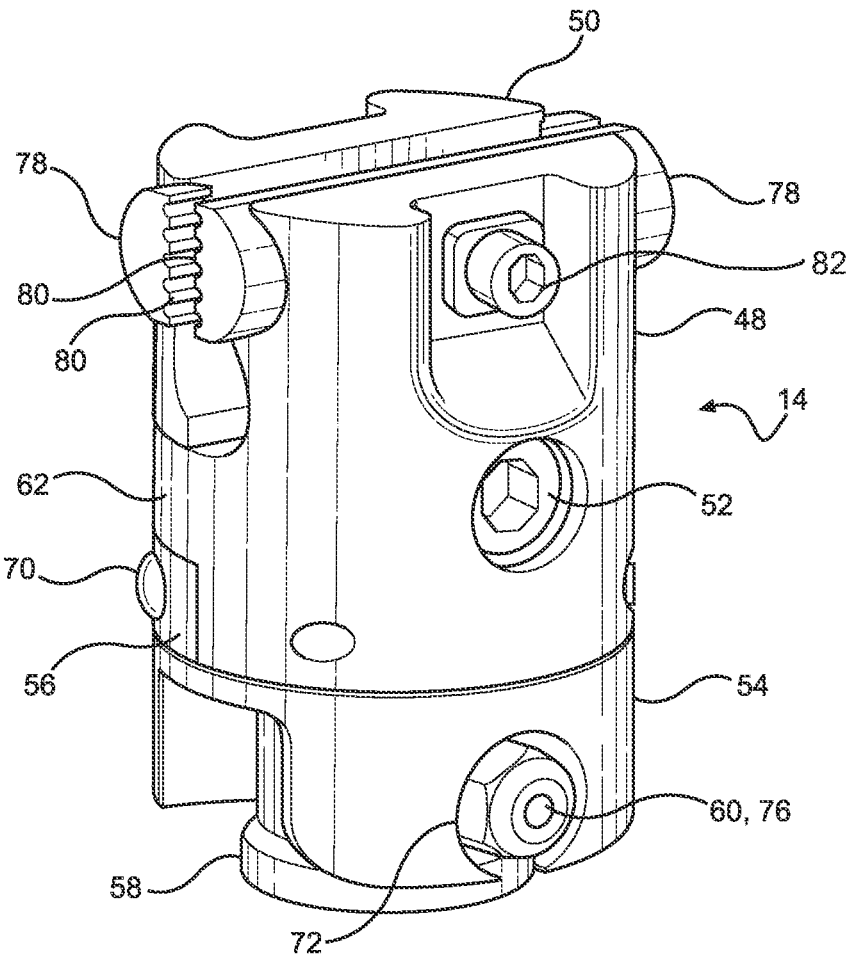
FIG. 8 is perspective view of a clamp module of the kit of FIG. 3.

Referring to FIG. 8, the clamp module 14 can include a fixed jaw 48, a sliding jaw 50, a drive member 52, a module base 54, a C-clamp 56, a mounting member 58, and a base fastener 60. The drive member 52 can be connected to the fixed jaw 48 and the sliding jaw 50. The base fastener 60 can connect the mounting member 58 to the module base 54. The module fastener 22 can connect the post member 16 to the mounting member 58 to create the first configuration clamp 10A and the first extension fasteners 28, 32 can connect the respective extensions 18, 20 to the mounting member 58 to create the respective second and third configuration clamps 10B, 10C.

The fixed jaw 48 can include a clamp base 62. The drive member 52 can move the sliding jaw 50 along the clamp base 62 toward and away from the fixed jaw 48. The drive member 52 can maintain the clamping force applied by the sliding jaw 50 and fixed jaw 48 onto the rocker panel flange 210 and can also release the clamping force. FIGS. 2-6 and 8 show the drive member 52 as a socket head bolt. The sliding jaw 50 can include a threaded bore into which the drive member 52 is inserted. Rotation of the drive member 52 can pull or push the sliding jaw toward or away from the fixed jaw 48. In alternated embodiments, the drive member 60 can be any appropriate structure, device, system or apparatus that can cause the sliding jaw 50 to move toward and away from fixed jaw 48 and maintain the clamping force after it has been set by a user.

Referring to FIGS. 3, 5 and 6, a tongue 66 and groove 68 can connect the sliding jaw 50 to the base 62 of the fixed jaw. The sliding jaw 50 can include the tongue 66 and the fixed jaw can include the groove 68. Alternate embodiments can include a reversed arrangement in which the fixed jaw 48 includes the tongue 66 and the sliding jaw 50 includes the groove 68. The tongue 66 can have a dovetail shape and the groove 68 can have a complimentary mating shape. The tongue 66 and groove 68 can prevent separation of the sliding jaw 50 away from the fixed jaw in a direction that is generally parallel to the longitudinal axis A.

Referring to FIGS. 3, 5, 6 and 8, a pair of bolts 70 can connect the C-clamp to the clamp base 62 of the fixed jaw 48. The module base 54 can include an annular flange that extends into the base 62 of the fixed jaw 48. Referring to FIG. 8, the clamp base 62 can include a pair of through holes 72 and the flange of the module base 54 can include a pair of through bores into which the bolts 70 are threaded. The module base 54 and the fixed jaw 48 can rotate relative to each other about the longitudinal axis A when the bolts 70 are loosened. The bolts 70 can be retightened when the base 54 and fixed jaw 48 have been rotated relative to each other into a desired orientation.

Referring to FIGS. 3, 5, 6 and 8, the module base 54 can include a pair of through holes 72 and the mounting member 58 can include a through hole. The base fastener 60 can include a bolt 74 and a nut 76 can connect the mounting member 58 to the module base 54. The mounting member 58 can freely pivot on the bolt 74 to move relative to the module base 54 when the bolt 74 and nut 76 are tightened and secure the mounting member 58 to the base 54. This allows the module base 54 to pivot relative to the mounting member 58 if the vehicle 200 pitches during the aerodynamic testing. The extensions 18, 20 can be used to change the height of the bolt 74 and nut 76 with respect to the test bed 306, thereby allowing adjustment of the height of the pivot axis about which the mounting member 58 and the module base 54 can pivot relative to each other. This pivot axis can be referred to as a pitch axis.

Referring to FIG. 8, each of the jaws 48, 50 can include a grip 78 that includes a plurality of teeth 80. The teeth 80 can deform the flange 210 of the rocker panel 208 when the adjustable rocker panel restrain clamp 10 is clamped onto the flange 210. This deformation can increase the clamping force applied to the flange 210 by the clamp 10. Each of the jaws 48, 50 can have a cylindrical surface and each of the grips 78 can have a cylindrical surface that mates with the cylindrical surface of the respective jaw 48, 50. Thus, the grips 78 can pivot relative to the jaws 48, 50 about an axis that is parallel to the longitudinal direction LD. A pair of bolts 82—one for each of the grips 78—can be loosened and retightened to allow pivoting adjustment of the grips 78 and locking into the desired pivoted position relative to the jaws 48, 50.

In alternate embodiments, the kit 12 can include a second rocker panel clamp 110 shown in FIG. 7 that is in addition to the adjustable rocker panel clamp 10. The second clamp 110 can include the fixed jaw 48, the sliding jaw 50, the drive member 52, the C-clamp 56, the base fastener 60, the bolts 70 and the grips 78 described above.

Comparing FIGS. 5 and 7, the clamp 110 can include an extended base 154 that has a length measured along the longitudinal axis A that is longer than a length measured along the longitudinal axis A of the module base 54 of the clamp 10A. The extended base 154 can include a pair of through holes 172.

Further, the mounting member 58 of the clamp 10 and the post member 16 can be integrated into a post member 116 (shown in phantom) that is a single component. The post member 116 can include through holes 172 and the bolt 74 can pass through the through holes 172 of the extended base 154 and the through hole of the post member 116 to connect the post member 116 to the extended base 154. The post member 116 can pivot on the bolt 74 to move relative to the extended base 154.

Assembly and disassembly of the second clamp 110 is not performed when the rocker panel height L changes from one vehicle 200 to the next to be tested in the wind tunnel 300. Instead, the first configuration clamp 10A or the second clamp 110 can be used so that at least a portion of the cylindrical section 182 of the post member 116 is located inside of the restraint post 304.

The methods described above can be modified to incorporate the second clamp 110. The method can include providing the first vehicle 200(1) having the first rocker panel height L1 and clamping the first configuration clamp 10A to the rocker panel flange 210 of the first vehicle 200(1).

After the testing is complete the first configuration clamp can be removed from the first vehicle 200(1). The first vehicle 200(1) can be removed from the test bed 306 and a second vehicle 200(2) having a second rocker panel height L2 that is different from the first rocker panel height L1 can be placed onto the test bed 306. The second clamp 110 can be clamped onto a rocker panel flange 210 of the second vehicle 200(2).

Alternative Embodiments

While certain embodiments of the invention are described above, it should be understood that the invention can be embodied and configured in many different ways without departing from the spirit and scope of the invention.

Alternate embodiments of the methods disclosed above can alter the sequence of the vehicles 200 that are clamped onto the test bed 306. For example, the third vehicle 200(3) or the second vehicle 200(2) can be tested initially and the first vehicle 200(1) can be tested subsequently. As a result, the second configuration clamps 10B or the third configuration clamp 10C or the second clamp 110 can be clamped and removed from the initial test vehicle 200(2) or 200(3) before the subsequent vehicle 200(1) is clamped and tested.

Although the fasteners 24, 26, 28, 30, 32, 34 are described above as being threaded fasteners, exemplary embodiments can include any appropriate fastener such as, but not limited to, C-clamps that engage corresponding structures formed on the mounting member 58, the extensions 18, 20 and the post member 16 as described above with respect to the C-clamp and the jaws 48, 50.

Exemplary embodiments of the kit 12 can omit the second extension 20 or can include additional extensions that are of different length in the longitudinal axis direction and/or different width so as to be able to hold greater weight. The members of the kit 12 can be made from various metals and/or alloys, but various other materials can be used to decrease the weight and/or improve strength and rigidity of the members. For example, various members of the kit can be made from ceramic material, plastic material, or other known materials that would be beneficial for the particular application of the kit 12.

What is claimed is:

1. A rocker panel restraint clamp kit for removably connecting a vehicle to a load cell in a wind tunnel, comprising:
   a clamp module including a first jaw, a second jaw, a drive member, and a clamp fastener, the drive member is connected to the first jaw and the second jaw and configured to displace the first jaw toward and away from the second jaw, the clamp fastener is connected to the second jaw;
   at least one extension including a first fastener and a second fastener; and
   a third fastener, wherein
   the clamp module is configured to form a first configuration clamp when the third fastener is directly connected to both of the clamp fastener and a fastener of a post member, and
   the clamp module and the extension are configured to form a second configuration clamp when the first fastener is directly connected to the clamp fastener and the second fastener is directly connected to the fastener of the post member.

2. The rocker panel restraint clamp kit according to claim 1, wherein the clamp module further includes a module base and a mounting member connected to the module base, the mounting member includes the first fastener.

3. The rocker panel restraint clamp kit according to claim 1, wherein
   the at least one extension includes a first extension having a first length and a second extension having a second length that is different than the first length,
   the second extension includes a fourth fastener and a fifth fastener, and
   the clamp module and the second extension are configured to form a third configuration clamp when the fourth fastener is directly connected to the clamp fastener and the fifth fastener is directly connected to the fastener of the post member.

4. The rocker panel restraint clamp kit according to claim 1, wherein
   the clamp fastener is a threaded bore, and
   the first fastener, the second fastener and the third fastener are threaded studs.

5. The rocker panel restraint clamp kit according to claim 1, wherein at least one of the first fastener and the second fastener is a threaded stud.

6. The rocker panel restraint clamp kit according to claim 1, wherein the first jaw is a fixed jaw and includes a jaw base, the second jaw is a sliding jaw and is slidable along the jaw base.

7. The rocker panel restraint clamp kit according to claim 6, wherein the clamp module further includes,
   a module base connected to the jaw base, and
   a mounting member pivotally connected to the jaw base, the mounting member includes the clamp fastener.

8. An aerodynamic test assembly for the vehicle in the wind tunnel, comprising:
   the rocker panel restrain clamp kit according to claim 1;
   a load cell configured to provide sensor data during a test session of the vehicle; and
   a restraint post configured to connect the post member to the load cell.

9. The aerodynamic test assembly according to claim 8, wherein the first jaw and the second jaw are at a first rocker panel height when the clamp module is connected to the post member to form the first configuration clamp.

10. The aerodynamic test assembly according to claim 9, wherein the first jaw and the second jaw are at a second rocker panel height when the clamp module, and the extension are connected to the post member to form the second configuration clamp, the second rocker panel height is greater than the first rocker panel height.

11. A method of using the aerodynamic test assembly according to claim 8, comprising:
   providing a first vehicle having a first rocker panel height;
   clamping the one of the first configuration clamp and the second configuration clamp to a rocker panel flange of the first vehicle;
   removing the one of the first configuration clamp and the second configuration clamp from the rocker panel flange;
   providing a second vehicle having a second rocker panel height that is different from the first rocker panel height;
   disassembling the one of the first configuration clamp first configuration clamp and the second configuration clamp and creating a different one of the first configuration clamp and the second configuration clamp; and
   clamping the different one of the first configuration clamp and the second configuration clamp to a rocker panel flange of the second vehicle.

12. A rocker panel restraint clamp kit for removably securing a vehicle to a test bed of a wind tunnel, comprising:
  a first clamp including,
    a first base having a first length along a longitudinal axis of the first clamp;
    a first fixed jaw connected to the first base;
    a first movable jaw movably mounted onto the first fixed jaw; and
    a first drive member connected to the first fixed jaw and the first movable jaw and configured to displace the first movable jaw toward and away from the first fixed jaw; and
  a second clamp including,
    a second base having a second length along a longitudinal axis of the second clamp that is greater than the first length;
    a second fixed jaw connected to the second base;
    a second movable jaw movably mounted onto the second fixed jaw; and
    a second drive member connected to the second fixed jaw and the second movable jaw and configured to displace the second movable jaw toward and away from the second fixed jaw;
    a first mounting member pivotally connected to the first base; and
    a module fastener, wherein
  the first mounting member includes a clamp fastener,
  the first base and the first mounting member are configured to form a first configuration of the first clamp when the module fastener is directly connected to both of the clamp fastener and a fastener of a first post member.

13. The rocker panel restraint clamp kit for use with a clamp body of claim 12, wherein the second clamp further includes a second mounting member pivotally connected to the second base.

14. The rocker panel restraint clamp kit according to claim 12, further comprising:
  an extension including a first fastener and a second fastener, the first fastener is configured to connect the extension to the first base, and the second fastener is configured to connect the extension to a first post member, wherein
  the first base, the first mounting member, and the extension are configured to form a second configuration of the first clamp when the first fastener is directly connected to the clamp fastener and the second fastener is directly connected to a fastener of the first post member.

15. An aerodynamic test assembly for a vehicle in a wind tunnel, comprising:
  the rocker panel restrain clamp kit according to claim 12;
  a load cell configured to provide sensor data during a test session of the vehicle; and
  a restraint post connected to the load cell and one of the first clamp and the second clamp, and the first clamp is in one of the first configuration and the second configuration when the restraint post is connected the first clamp.

16. The rocker panel restraint clamp kit according to claim 12, wherein
  first fixed jaw is pivotally connected to the first base, and
  the second fixed jaw is pivotally connected to the second base.

17. A method of securing different vehicles during aerodynamic testing using an adjustable rocker panel restraint clamp connected to a load cell, the method comprising:
  providing a first vehicle having a first rocker panel height;
  creating a first configuration of the adjustable rocker panel restraint clamp by connecting a first post member directly to a clamp module of the adjustable rocker panel restraint clamp such that the adjustable rocker panel restraint clamp has a first clamp height that falls within a predetermined range of clamp heights relative to a test bed surface;
  clamping the first configuration of the adjustable rocker panel restraint clamp to a rocker panel flange of the first vehicle;
  removing the first configuration of the adjustable rocker panel restraint clamp from the first vehicle;
  providing a second vehicle having a second ground clearance height that is greater than the first ground clearance height;
  disassembling the first post member from the clamp module;
  creating a second configuration of the adjustable rocker panel restraint clamp by connecting a first extension to the clamp module and connecting the first post member to the first extension such that the adjustable rocker panel restraint clamp has a second clamp height that falls within the predetermined range of clamp heights relative to the test bed surface; and
  clamping the second configuration of the adjustable rocker panel restraint clamp to a rocker panel flange of the second vehicle.

18. The method of claim 17, further comprising:
  removing the second configuration of the adjustable rocker panel restraint clamp from the second vehicle;
  providing a third vehicle having a third rocker panel height that is greater than the second rocker panel height;
  disassembling the first extension from each of the clamp module and the first post member;
  creating a third configuration of the adjustable rocker panel restraint clamp by connecting a second extension to each of the clamp module and the first post member such that the adjustable rocker panel restraint clamp has a third clamp height that falls within the predetermined range of clamp heights relative to the test bed surface; and
  clamping the third configuration of the adjustable rocker panel restraint clamp to a rocker panel flange of the third vehicle.

* * * * *